United States Patent
Lim et al.

(10) Patent No.: US 10,744,851 B2
(45) Date of Patent: Aug. 18, 2020

(54) VEHICULAR HEATING DEVICE AND COOLING WATER CIRCULATING PUMP PROVIDED THEREIN

(71) Applicant: Hanon Systems, Daejeon (KR)

(72) Inventors: Cha You Lim, Daejeon (KR); Jae Hoon Kim, Daejeon (KR); Dong-Hee Ye, Daejeon (KR)

(73) Assignee: Hanon Systems, Daejeon (KR)

( * ) Notice: Subject to any disclaimer, the term of this patent is extended or adjusted under 35 U.S.C. 154(b) by 32 days.

(21) Appl. No.: 15/544,555

(22) PCT Filed: Aug. 18, 2016

(86) PCT No.: PCT/KR2016/009082
§ 371 (c)(1),
(2) Date: Jul. 19, 2017

(87) PCT Pub. No.: WO2017/030382
PCT Pub. Date: Feb. 23, 2017

(65) Prior Publication Data
US 2018/0264914 A1   Sep. 20, 2018

(30) Foreign Application Priority Data

Aug. 18, 2015 (KR) .................. 10-2015-0115886
Oct. 27, 2015 (KR) .................. 10-2015-0149261

(51) Int. Cl.
*B60H 1/06* (2006.01)
*B60H 1/03* (2006.01)
(Continued)

(52) U.S. Cl.
CPC ........... *B60H 1/06* (2013.01); *B60H 1/00314* (2013.01); *B60H 1/034* (2013.01); *B60H 1/2221* (2013.01);
(Continued)

(58) Field of Classification Search
CPC ...... B60H 1/06; B60H 1/00314; B60H 1/034; B60H 1/2221; B60H 1/00328;
(Continued)

(56) References Cited

U.S. PATENT DOCUMENTS 4,874,924 A * 10/1989 Yamamoto .......... A01M 1/2077
392/395
7,965,928 B2 * 6/2011 Eichholz ................. D06F 39/04
392/417
(Continued)

FOREIGN PATENT DOCUMENTS

JP   2013103632 A   5/2013
KR   19990088383 A   12/1999
(Continued)

OTHER PUBLICATIONS

International Search Report issued in PCT/KR2016/009082 dated Nov. 25, 2016.

*Primary Examiner* — Grant Moubry
*Assistant Examiner* — John E Bargero
(74) *Attorney, Agent, or Firm* — Norton Rose Fulbright US LLP; James R. Crawford

(57) ABSTRACT

The present invention relates to a vehicular heating device comprising: a vehicular engine cooling unit for connecting an engine, a water pump, and a radiator on a first cooling water circulating line to cool the engine; and a vehicular indoor space heating unit for connecting the engine, the water pump, and a heater core on a second cooling water circulating line to heat an indoor space of the vehicle, wherein the vehicular heating device comprises a heating means mounted on the second cooling water circulating line to heat cooling water supplied to the heater core. According to the present invention, the heating performance of the cooling water, which is supplied to the heater core during an (Continued)

initial cold start of the vehicle is improved, thereby increasing the indoor heating efficiency of the vehicle during a winter season.

5 Claims, 12 Drawing Sheets

(51) Int. Cl.
*B60H 1/22* (2006.01)
*F04D 29/58* (2006.01)
*B60H 1/00* (2006.01)
*H05B 3/42* (2006.01)
*F04D 13/06* (2006.01)
*F04D 29/00* (2006.01)

(52) U.S. Cl.
CPC ....... *F04D 13/0686* (2013.01); *F04D 29/007* (2013.01); *F04D 29/5806* (2013.01); *F04D 29/588* (2013.01); *H05B 3/42* (2013.01); *B60H 1/00328* (2013.01); *B60H 2001/2278* (2013.01); *H05B 2203/013* (2013.01)

(58) Field of Classification Search
CPC ......... B60H 2001/2278; F04D 13/0686; F04D 29/007; F04D 29/5806; F04D 29/588; F05B 3/42; H05B 2203/013
USPC ...................................................... 237/12.6
See application file for complete search history.

(56) References Cited

U.S. PATENT DOCUMENTS

| | | | |
|---|---|---|---|
| 8,480,380 B2 * | 7/2013 | Pyun | B60S 1/488 417/313 |
| 2009/0274555 A1 * | 11/2009 | Ouwehand | F04D 1/06 415/203 |

FOREIGN PATENT DOCUMENTS

| | | |
|---|---|---|
| KR | 20030046819 A | 6/2003 |
| KR | 20090090076 A | 8/2009 |
| KR | 20140106788 A | 9/2014 |
| WO | 2012120718 A1 | 9/2012 |

* cited by examiner though and and the rpm of the
VEHICULAR HEATING DEVICE AND COOLING WATER CIRCULATING PUMP PROVIDED THEREIN This application is a 371 of International Application No. PCT/KR2016/009082 filed Aug. 18, 2016, which claims priority from Korean Patent Application No. 10-2015-0115886 filed Aug. 18, 2015, and Korean Patent Application No. 10-2015-0149261, filed Oct. 27, 2015, each of which is incorporated herein by reference in its entirety for all purposes.

TECHNICAL FIELD

The present invention relates to a vehicular heating device capable of increasing heating performance of cooling water supplied to a heater core during an initial cold start of a vehicle by disposing a heating means on a cooling water circulating line supplying cooling water to the heater core, and a cooling water circulating pump provided in the vehicular heating device.

BACKGROUND ART

Generally, an air conditioning system is installed in a vehicle. Further, the air conditioning system includes a heating system for heating an indoor space of the vehicle, a cooling system for cooling the indoor space of the vehicle, and heating, ventilation and air conditioning (HVAC) controlling temperature/strength/direction of air introduced into the indoor space of the vehicle.

In the vehicle driven by fossil energy, engine cooling water is directly used as a heat source for heating the indoor space of the vehicle. That is, the cooling water that takes heat from an engine passes through the heater core in the HVAC and then is introduced into the engine again. During the process, the cooling water transfers heat to air passing through the heater core. Further, the air passing through the heater core is introduced into the indoor space of the vehicle to heat the indoor space of the vehicle.

FIG. 1 is a conceptual diagram of the existing vehicular heating device 10. As illustrated in FIG. 1, the existing vehicular heating device 10 is configured to allow cooling water to circulate a heater core 1 equipped in the HVAC, an engine 2, a water pump 3, a thermostat 5, and a radiator 6 to circulate cooling water. The cooling water heated by passing through the engine 2 is supplied to the heater core 1 and the indoor space of the vehicle is heated by exchanging heat generated in the heater core 1.

If a vehicle equipped with the existing vehicular heating device is driven, in particular, during a winter season, a driver experiences difficulties due to the cold. That is, since it takes much time until the cooling water supplied to the heater core 1 is sufficiently heated by the engine 2, there is a problem that the low temperature state inside the vehicle cannot but be continued for a predetermined period of time.

In particular, a diesel engine recently under development has excellent efficiency, such that a temperature rise of cooling water is delayed. That is, the excellent engine efficiency means that the engine can be operated with a minimum driving force, such that it takes a relatively long time to heat the cooling water circulating the engine. Accordingly, it takes a long time to heat the vehicle with the cooling water that absorbs the heat generated from the engine. In particular, the initial indoor heating performed immediately after the cold start during the winter season cannot but be more vulnerable.

Furthermore, as a heat source capable of increasing automatic transmission oil heating performance and engine oil heating performance is required to cope with recent fuel efficiency regulations, the heat source is insufficient during a low temperature start during a winter season and therefore the heating performance may be lowered. Further, a cooling water circulating pump for circulating the cooling water is interlocked with an rpm of an engine, and the rpm of the engine for each vehicle speed may be reduced due to a multistage of a transmission and therefore the circulation efficiency of the cooling water circulating pump may be lowered and a flow rate of the cooling water is insufficient and therefore the heating performance may be vulnerable.

In order to solve the above problem, there is a case where an auxiliary heater using electricity during the initial low temperature start is mounted on a heating part of the heater core 1. However, a discharge air volume of the heater core 1 may be reduced, and therefore there is a problem in that the efficiency of the initial indoor heating is still low during the winter season.

RELATED ART DOCUMENT

Patent Document

KR 2014-0106788 A (2014.09.04.)

DISCLOSURE

Technical Problem

An object of the present invention is to provide a vehicular heating device capable of increasing heating performance of cooling water supplied to a heater core during an initial cold start of a vehicle by disposing a heating means on a cooling water circulating line supplying cooling water to the heater core.

Another object of the present invention is to provide a cooling water circulating pump capable of improving heating performance of a vehicle by including a heating means in a circulating pump, and a vehicular heating device including the same.

Still another object of the present invention is to provide a cooling water circulating pump capable of improving mountability of a heating means and increasing heating performance of a vehicle without affecting a discharge air volume of a heater core, and a vehicular heating device including the same.

Technical Solution

In one general aspect, a vehicular heating device including a vehicular engine cooling unit for connecting an engine, a water pump, and a radiator on a first cooling water circulating line to cool the engine and a vehicular indoor space heating unit for connecting the engine, the water pump and a heater core on a second cooling water circulating line to heat an indoor space of the vehicle, the vehicular heating device includes: a heating means mounted on the second cooling water circulating line and heating cooling water supplied to the heater core.

The vehicular heating device may further include: a circulating pump mounted on the second cooling water circulating line and supplying the cooling water to the heater core, wherein the heating means and the circulating pump may be integrally formed.

The circulating pump may include: a motor; a rotating body rotated by a driving force of the motor to move the cooling water in the second cooling water circulating line; a case having an empty space formed therein to house the motor; and a cooling water channel formed in the case, and the heating means may be provided in the case to heat the cooling water flowing in the cooling water channel.

The circulating pump may further include: an inlet communicating with the cooling water channel and introduced with the cooling water flowing in the second cooling water circulating line; and an outlet communicating with the cooling water channel and discharging the cooling water flowing in the cooling water channel to the second cooling water circulating line.

The case may be formed to surround an outer periphery of the motor while being spaced apart from an outside of the motor by a predetermined distance and the cooling water channel may be formed between the motor and the case.

The heating means may be attached to the inner or outer side surface of the case in a film form and may be a heating element that generates heat by being supplied with power.

The inlet and the outlet may be disposed on a straight line.

The circulating pump may have a form in which the cooling water channel is formed long in a height direction of the case, the inlet is formed long in a length direction of the case to communicate with one end of the cooling water channel, and the outlet communicates with the other end of the cooling water channel at an upper side of the case.

The case may be provided with an insertion part adjacent to the cooling water channel and inserted with the heating means.

The insertion part may be a shape in which a side adjacent to the cooling water channel is planar and an opposite side thereto is arced toward the cooling water channel.

The insertion part may be formed in plural along a circumference of the cooling water channel, and the heating means may be provided in plural corresponding to the number of insertion parts.

The case may further include a cover closing an opened end portion of one side of the insertion part.

The case may include a first tube forming the cooling water channel and a second tube surrounding the first tube.

The heating means may be attached to an outer circumference surface of the first tube in a film form and may be a heating element that generates heat by being supplied with power.

The case may include a first case provided with the cooling water channel, the inlet, and the outlet and a second case having the motor and the rotating body embedded in a space between the first case and the second case when the second case is coupled to the first case.

The circulating pump may be operated if a RPM of the engine is less than a predetermined RPM and the heating means may be operated if a temperature of cooling water introduced into the circulating pump is less than a predetermined temperature.

The circulating pump and the heating means may be operated if an outside air temperature is less than a reference temperature and may not be operated if the outside air temperature is equal to higher than the reference temperature.

In another general aspect, a cooling water circulating pump includes: a circulating pump including a motor, a rotating body rotated by a driving force of the motor to move cooling water, a case having an empty space formed therein to house the motor, and a cooling water channel formed in the case; and a heating means provided in the case to heat the cooling water flowing in the cooling water channel.

The case may be formed to surround an outer periphery of the motor while being spaced apart from an outside of the motor by a predetermined distance, and the cooling water channel may be formed between the motor and the case.

The circulating pump may further include: an inlet communicating with the cooling water channel and introduced with the cooling water; and an outlet communicating with the cooling water channel and discharging the cooling water flowing in the cooling water channel.

The inlet and the outlet may be disposed on a straight line.

The circulating pump may have a form in which the cooling water channel is formed long in a height direction of the case, the inlet is formed long in a length direction of the case to communicate with one end of the cooling water channel, and the outlet communicates with the other end of the cooling water channel at an upper side of the case.

The case may be provided with an insertion part adjacent to the cooling water channel and inserted with the heating means.

Advantageous Effects

According to the present invention, the vehicular heating device may increase the heating performance of the cooling water supplied to the heater core during the initial cold start of the vehicle, thereby increasing the indoor heating efficiency of the vehicle, in particular, during the winter season.

Further, since the heating means is integrally formed with the circulating pump on the cooling water circulating line, the mounting space of the heating means is be minimized and the discharge air volume of the heater core is not affected, such that the indoor heating efficiency of the vehicle may be increased.

In addition, the heat generation of the motor provided in the circulating pump may be used to heat the cooling water, thereby more increasing the heating performance of the cooling water.

In addition, the heating means and the circulating pump configuring the vehicular heating device may be automatically controlled depending on the predetermined conditions, and therefore may be efficiently operated only when necessary, thereby minimizing the reduction in the fuel efficiency as well as providing the pleasant heating feeling to the driver.

In addition, the cooling water circulating pump according to the present invention may assist the heater core to perform the heating of the vehicle, thereby improving the temperature comfort of the passenger.

BEST MODE

Hereinafter, a vehicular heating device according to the present invention and a cooling water circulating pump included therein will be described in detail with reference to the accompanying drawings.

Figure 1:
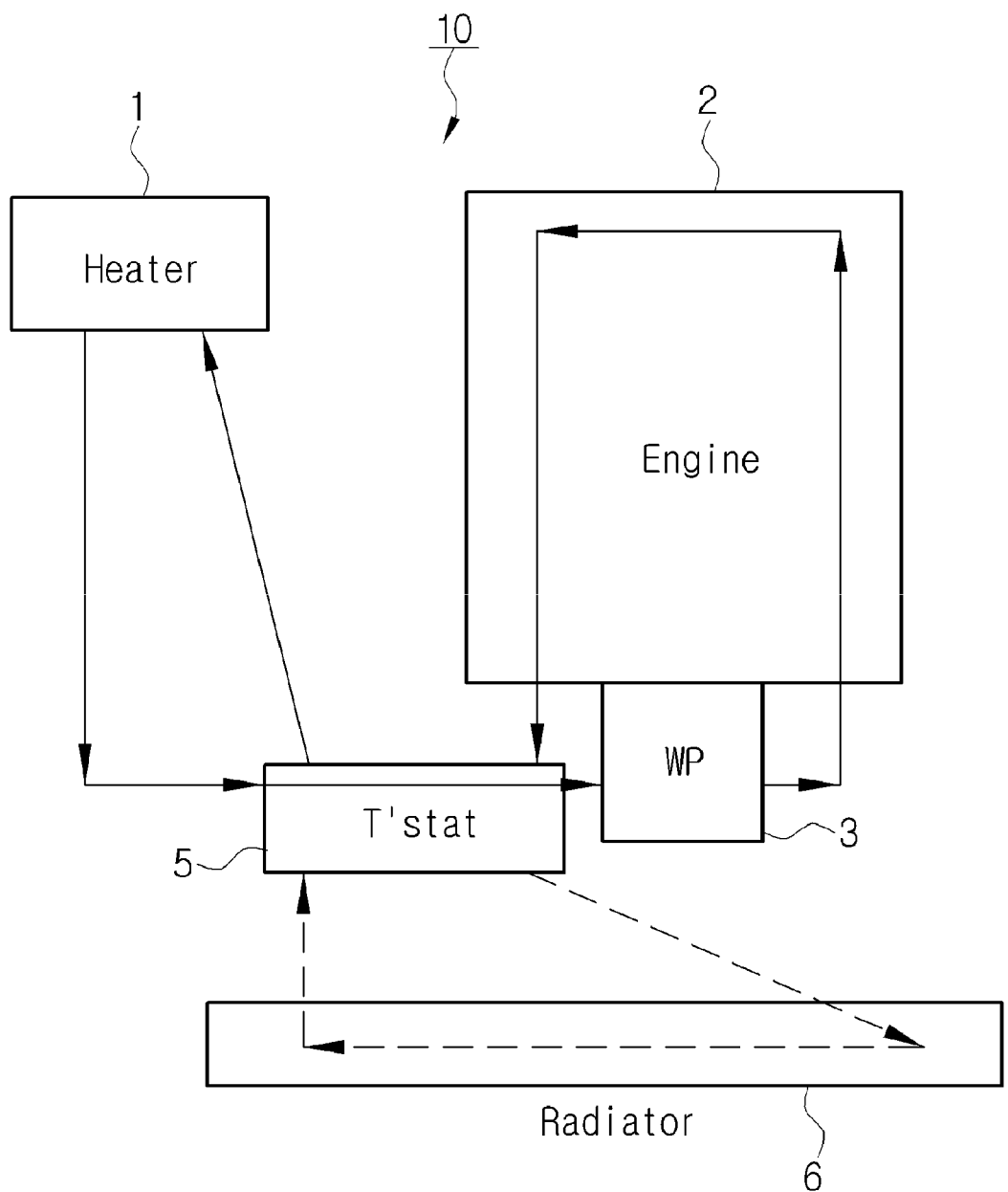
FIG. 1 is a conceptual view of the existing vehicular heating device.
Figure 2:
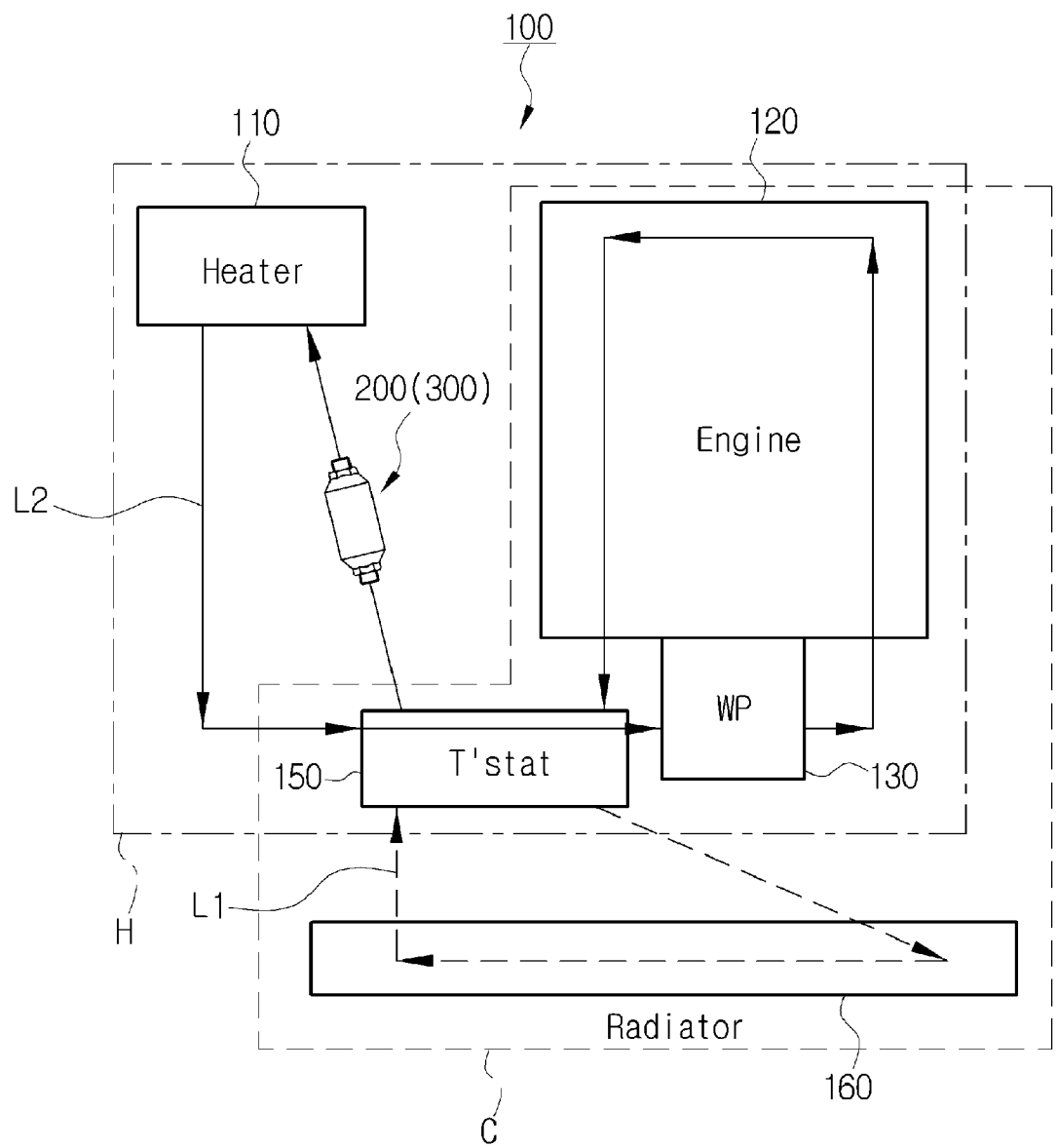
FIG. 2 is a conceptual view of a vehicular heating device according to an exemplary embodiment of the present invention.

FIG. 2 is a conceptual diagram of a vehicular heating device 100 according to an exemplary embodiment of the present invention. As illustrated in FIG. 2, the vehicular heating device 100 according to the exemplary embodiment of the present invention is configured to include a vehicular engine cooling unit C and a vehicular indoor space heating unit H.

The vehicular engine cooling unit C includes a first cooling water circulating line L1 forming a closed circuit and an engine 120, a water pump 130, a thermostat 150 and a radiator 160 provided on the first cooling water circulating line L1.

The water pump 130 circulates cooling water accommodated in the first cooling water circulating line L1. High temperature cooling water passing through the engine 120 is delivered to the radiator 160 through the water pump 130 and the cooling water cooled by passing through the radiator 160 is supplied to the engine 120 again to cool the engine 120.

The thermostat 150 detects a temperature of the cooling water to selectively supply the cooling water passing through the thermostat 150 to the heater core 110 or the radiator 160.

A vehicular indoor space heating unit H is configured to supply the high temperature cooling water passing through the engine 120 to the heater core 110 and heat air supplied to the indoor space of the vehicle using the high temperature cooling water to heat the indoor space of the vehicle.

The vehicular indoor space heating unit H includes a second cooling water circulating line L2 forming a closed circuit, the heater core 110 provided on the second cooling water circulating line L2, the engine 120, the water pump 130, and the thermostat 150.

The water pump 130 circulates the cooling water accommodated in the second cooling water circulating line L2. However, the high temperature cooling water passing through the engine 120 is delivered to the heater core 110 through the water pump 130 and the air introduced into the indoor space is heated by exchanging heat by the heater core 110, such that the heated air may be introduced into the indoor space of the vehicle.

However, since the temperature of the cooling water passing through the engine 120 is low during the initial vehicle start in which the temperature of the engine 120 is not heated to a predetermined level, such that the low temperature cooling water cannot but be supplied to the heater core 110. In this case, the air passing through the heater core 110 is not heated sufficiently and therefore cold air is introduced into the indoor space of the vehicle.

Therefore, if the temperature of the engine 120 is equal to or lower than a predetermined temperature, the vehicular indoor space heating unit H configuring the vehicular heating device 100 according to the present invention may have the following configuration to sufficiently raise the temperature of the cooling water supplied to the heater core 110.

Specifically, the vehiclular indoor space heating unit H may be configured to include the heating means 200. The heating means 200 is mounted at the front end of the heater core 110 on the second cooling water circulating line L2 to heat the cooling water supplied to the heater core 110 under predetermined conditions. The heating means 200 may heat the cooling water supplied to the heater core 110 for the indoor heating of the vehicle during the initial cold start in the winter season, such that the heating performance of the cooling water may be increased.

Here, the heating means 200 may be used without limitation as long as it may heat the cooling water of the second cooling water circulating line L2. For example, the heating means 200 may be a surface heater or a hot wire surrounding a predetermined region of the second cooling water circulating line L2, and may also be a positive temperature coefficient (PTC) heater attached to an inside or an outside of the second cooling water circulating line L2 to generate heat.

The vehicular indoor space heating unit H according to an exemplary embodiment of the present invention may further include a circulating pump 300 mounted on the second cooling water circulating line L2 for circulating the cooling water and operated under the predetermined conditions. In this case, it is preferable that the heating means 200 and the circulating pump 300 are integrally formed.

Hereinafter, the detailed configuration of the circulating pump 300 formed integrally with the heating means 200 will be described in detail with reference to the accompanying drawings.

Figure 3:
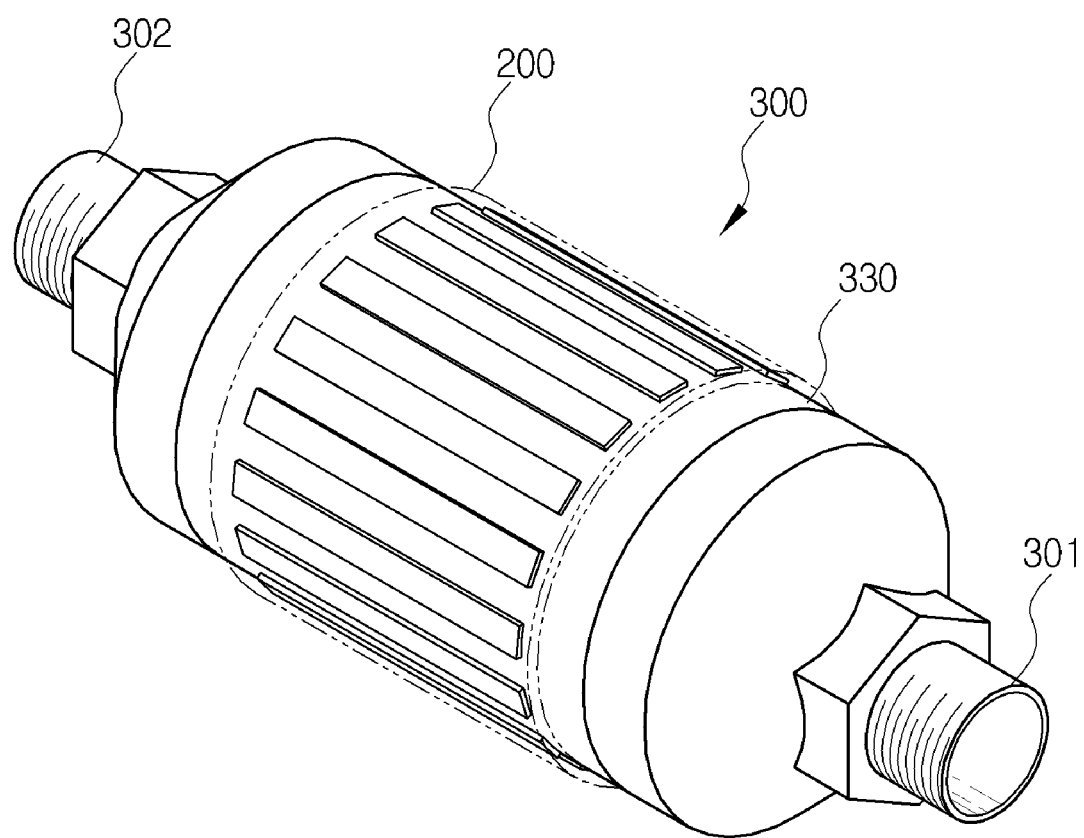
FIG. 3 is an assembled perspective view of a cooling water circulating pump according to an exemplary embodiment of the present invention.
Figure 4:
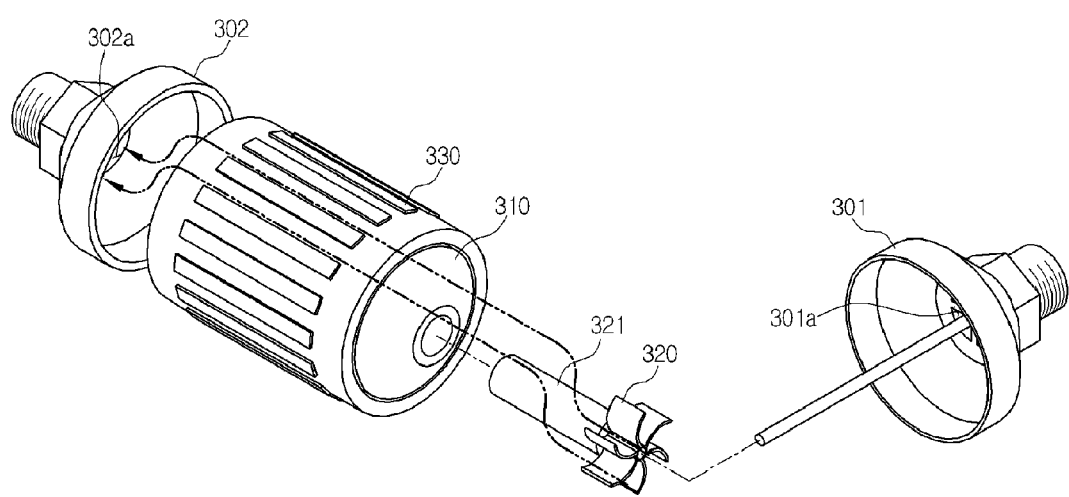
FIG. 4 is an exploded perspective view of the cooling water circulating pump according to the exemplary embodiment of the present invention.
Figure 5:
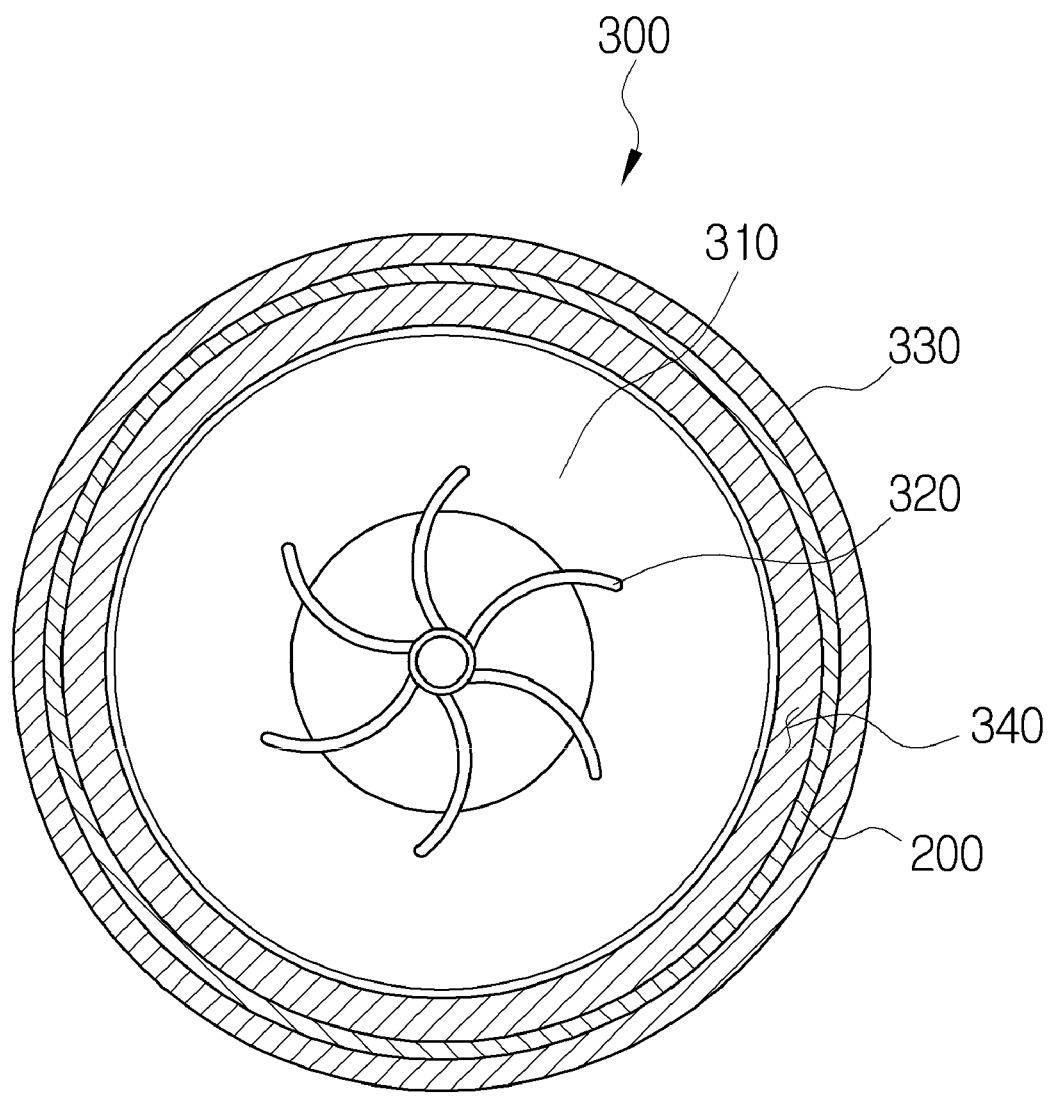
FIG. 5 is a cross-sectional view of the cooling water circulating pump according to the exemplary embodiment of the present invention.

FIG. 3 is an assembled perspective view of a cooling water circulating pump according to an exemplary embodiment of the present invention and FIG. 4 is an exploded perspective view of the cooling water circulating pump according to the exemplary embodiment of the present invention. FIG. 5 is a cross-sectional view of the cooling water circulating pump according to the exemplary embodiment of the present invention.

The cooling water circulating pump according to an exemplary embodiment of the present invention may include the heating means 200 and the circulating pump 300. Here, the circulating pump 300 may be configured to include a motor 310, a rotating body 320 coupled to a driving shaft of the motor 310 and rotated by a driving force of the motor 310 to move the cooling water of the second cooling water circulating line L2, a case 330 having an empty space formed therein to house the motor 310, and a cooling water channel 340 formed in the case 330. In this case, the heating means 200 is provided in the case 330 to heat the cooling water flowing in the cooling water channel 340.

Here, the motor 310 may be a cylindrical shape, and the rotating body 320 may be an impeller. One side of the rotating body 320 may be coupled to a magnet 321 that is inserted into the driving shaft of the motor 310 to rotate the rotating body 320.

The case 330 may be a cylindrical shape and may be located between an inflow cover 301 for an inflow of cooling water and an outflow cover 302 for an outflow of cooling water. The inflow cover 301 is provided with an inlet 301*a* for the inflow of cooling water. The inlet 301*a* communicates with the cooling water channel 340 and is introduced with the cooling water flowing through the second cooling water circulating line L2. Further, the outflow cover 302 is provided with an outlet 302*a* for the outflow of cooling water. The outlet 302*a* communicates with the cooling water channel 340 and discharges the cooling water flowing in the cooling water channel 340 to the second cooling water circulating line L2.

In addition, the case 330 may be formed to surround an outer periphery of the motor 310 while being spaced apart from the outside of the motor 310 by a predetermined distance. That is, a diameter of the case 330 is formed to be larger than that of the motor 310, and the cooling water channel 340 in which the cooling water flows is formed between the motor 310 and the case 330. Accordingly, if the cooling water is introduced through the inlet 301*a* as shown by an arrow in FIG. 4, the introduced cooling water passes through the cooling water channel 340 between the motor 310 and the case 330 and is discharged through the outlet 302*a*.

Here, the heating means 200 according to the exemplary embodiment of the present invention may be installed inside or outside the case 330 to heat the cooling water flowing in the cooling water channel 340. Specifically, the heating means 200 may be attached to the inner or outer side surface of the case 330 in a film form and may be a heating element that generates heat when being supplied with power. For example, as illustrated in FIG. 5, it is most effective that the heating means 200 is attached to the inner side surface of the case 330 to directly heat the cooling water passing through the cooling water channel 340.

Further, as illustrated in FIG. 4, it is preferable that the cooling water circulating pump is formed in an in-line type in which the inlet 301*a* and the outlet 302*a* are arranged on a straight line. The structure may smoothly move the cooling water in the cooling water circulating pump to improve the circulation performance of the cooling water.

Figure 6:
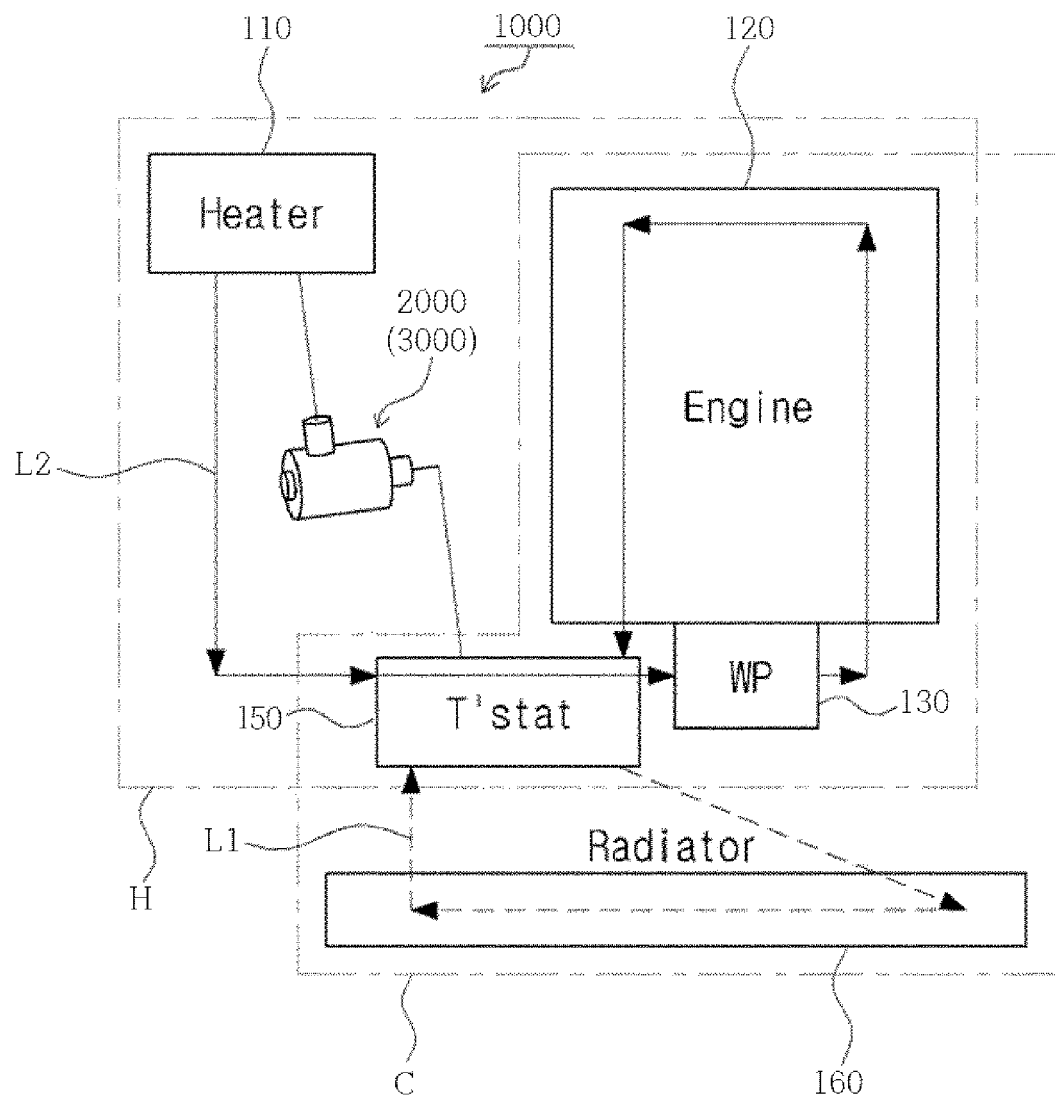
FIG. 6 is a conceptual view of a vehicular heating device according to another exemplary embodiment of the present invention.

Meanwhile, FIG. 6 is a conceptual view of a vehicular heating device 1000 according to another exemplary embodiment of the present invention. The vehicular heating device 1000 according to another exemplary embodiment of the present invention differs from the vehicular heating device 100 according to the exemplary embodiment only in the configuration of the cooling water circulating pump. Therefore, the same components as those of the vehicular heating device 100 according to the exemplary embodiment described above are denoted by the same reference numerals, and the description thereof will be simplified or omitted.

As described above, the vehicular engine cooling unit C includes the first cooling water circulating line L1 forming a closed circuit and the engine 120, the water pump 130, the thermostat 150 and the radiator 160 provided on the first cooling water circulating line L1. Further, the vehicular indoor space heating unit H for is configured to supply the high temperature cooling water passing through the engine 120 to the heater core 110 and heat air supplied to the indoor space of the vehicle using the high temperature cooling water to heat the indoor space of the vehicle.

At this point, the vehicular indoor space heating unit H may be configured to include a heating means 2000. The heating means 2000 is mounted at the front end of the heater core 110 on the second cooling water circulating line L2 to heat the cooling water supplied to the heater core 110 under predetermined conditions. The heating means 2000 may heat the cooling water supplied to the heater core 110 for the indoor heating of the vehicle during the initial cold start in the winter season, such that the heating performance of the cooling water may be increased.

Here, the heating means 2000 may be used without limitation as long as it may heat the cooling water of the second cooling water circulating line L2. For example, the heating means 2000 may be a surface heater or a hot wire surrounding a predetermined region of the second cooling water circulating line L2, and may also be the PTC heater attached to an inside or an outside of the second cooling water circulating line L2 to generate heat.

The vehicular indoor space heating unit H according to another exemplary embodiment of the present invention may further include a circulating pump 3000 mounted on the second cooling water circulating line L2 for circulating the cooling water and operated under the predetermined conditions. In this case, it is preferable that the heating means 2000 and the circulating pump 3000 are integrally formed.

Hereinafter, the detailed configuration of the circulating pump 3000 formed integrally with the heating means 2000 will be described in detail with reference to the accompanying drawings.

Figure 7:
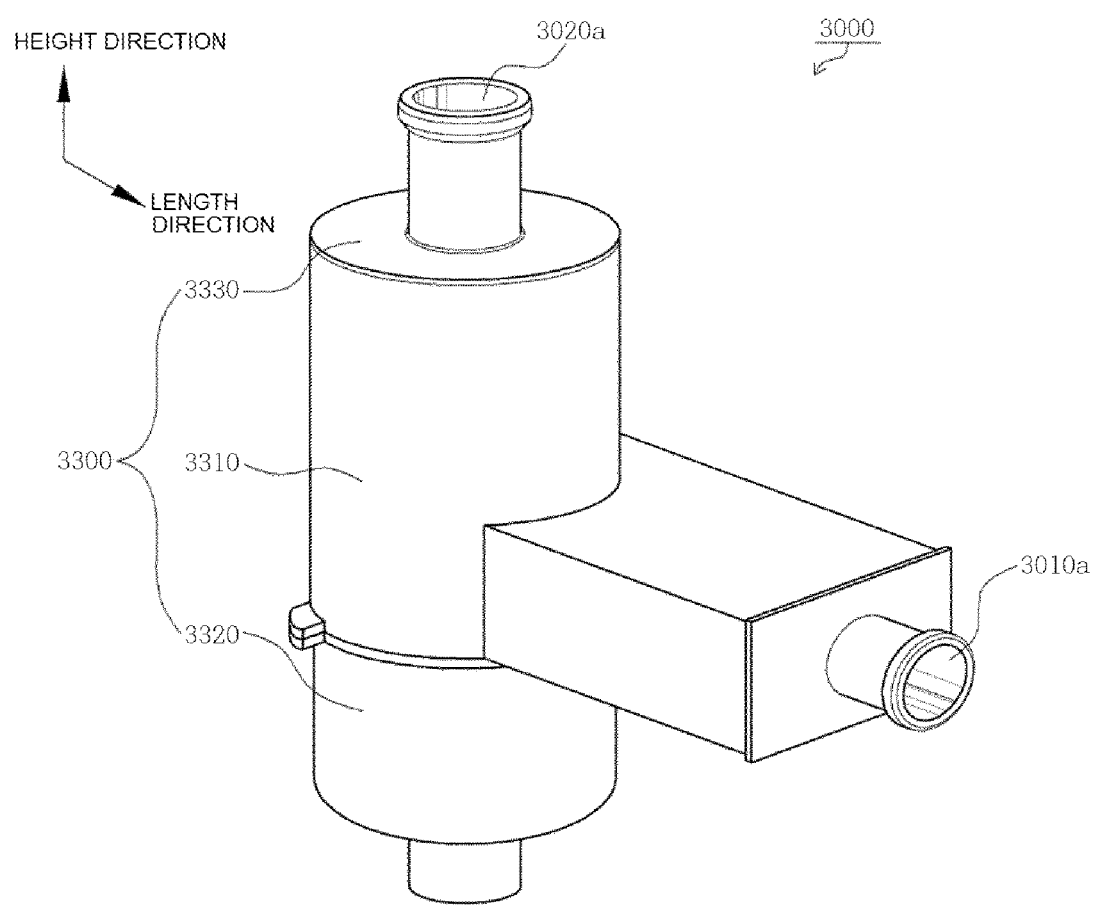
FIG. 7 is an assembled perspective view of the cooling water circulating pump according to another exemplary embodiment of the present invention.
Figure 8:
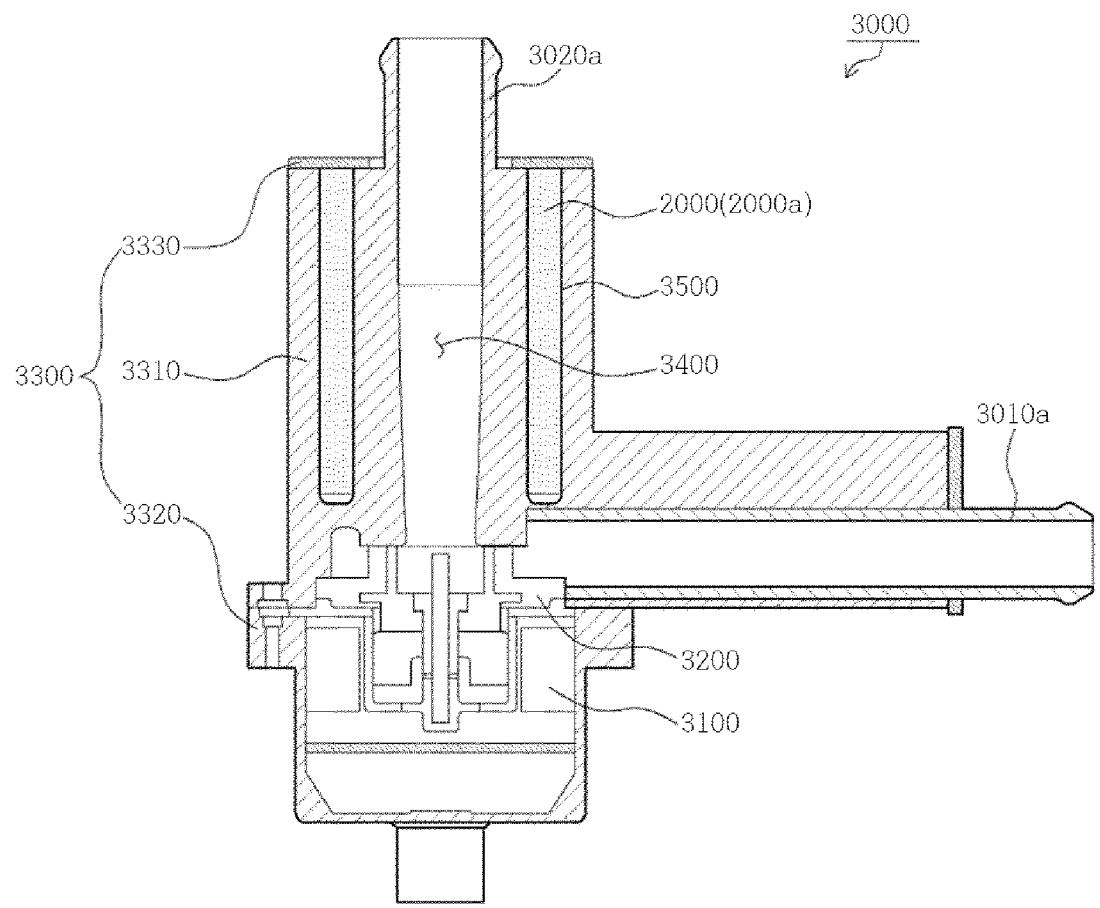
FIG. 8 is a cross-sectional view of the cooling water circulating pump according to another exemplary embodiment of the present invention.
Figure 9:
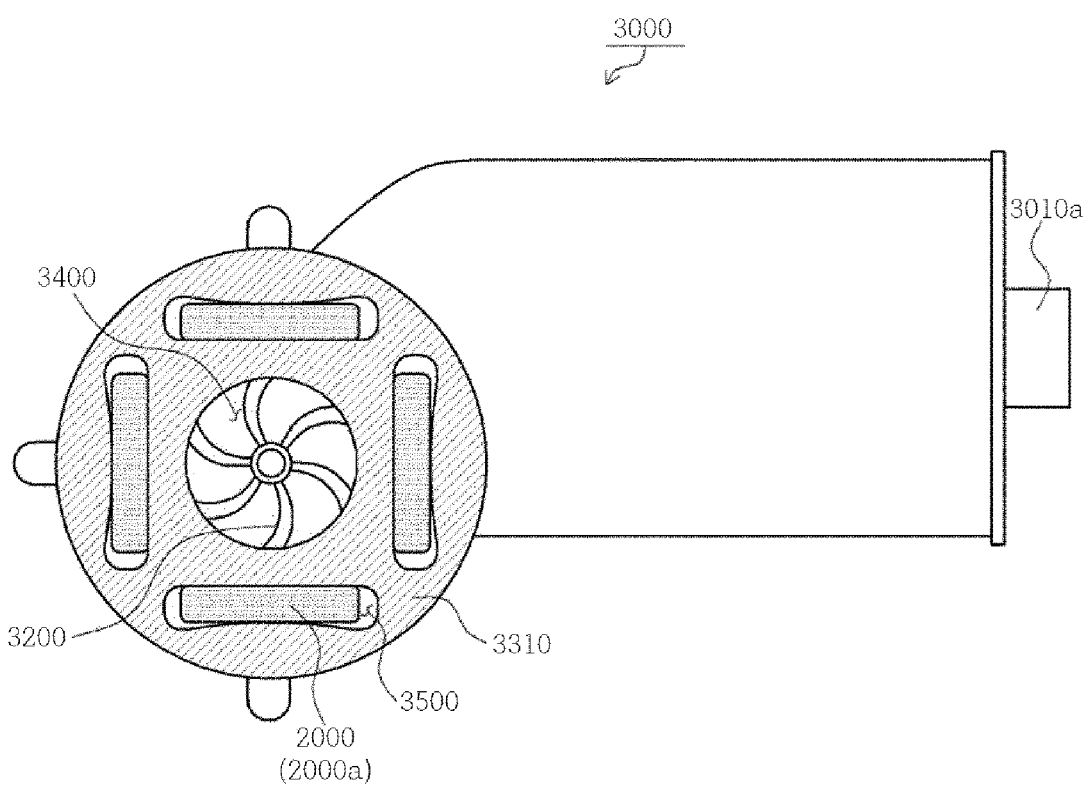
FIG. 9 is a top plan view of the cooling water circulating pump according to another exemplary embodiment of the present invention.

FIG. 7 is an assembled perspective view of the cooling water circulating pump according to another exemplary embodiment of the present invention and FIG. 8 is a cross-sectional view of the cooling water circulating pump according to another exemplary embodiment of the present invention. FIG. 9 is a top plan view of the cooling water circulating pump according to another exemplary embodiment of the present invention.

The cooling water circulating pump according to another exemplary embodiment of the present invention may be configured to include the heating means 2000 and the circulating pump 3000, like the cooling water circulating pump according to the exemplary embodiment. Here, the circulating pump 3000 may be configured to include a motor 3100, a rotating body 3200 rotated by a driving force of the motor 3100 to move the cooling water of the second cooling water circulating line L2, a case 3300 having an empty space formed therein to house the motor 3100, and a cooling water channel 3400 formed in the case 3300. In this case, the heating means 2000 is provided in the case 3300 to heat the cooling water flowing in the cooling water channel 3400.

A driving shaft of the motor 3100 is coupled to the rotating body 3200 to rotate the rotating body 3200, in which the rotating body 3200 may be an impeller.

The case 3300 is a basic body configuring the cooling water circulating pump, and is provided with the cooling water channel 3400, an inlet 3010*a*, and an outlet 3020*a*. The inside of the cooling water channel 3400 is provided with a space in which the cooling water flows. The inlet 3010*a* communicates with the cooling water channel 3400 and is introduced with the cooling water flowing through the second cooling water circulating line L2. Further, the outlet 3020*a* communicates with the cooling water channel 3400 and discharges the cooling water flowing in the cooling water channel 3400 to the second cooling water circulating line L2. Accordingly, if the cooling water is introduced through the inlet 3010*a*, the introduced cooling water is discharged through the outlet 3020*a* via the cooling water channel 3400.

The cooling water circulating pump according to another exemplary embodiment of the present invention is formed in a form in which the cooling water channel 3400 is formed long in a height direction (height direction in FIG. 7) of the case 3300, the inlet 3010*a* is formed long in a length direction (length direction in FIG. 7) of the case 3300 to communicate with one end of the cooling water channel 3400, and the outlet 3020*a* communicates with the other end of the cooling water channel 3400 from an upper side of the case 3300. The cooling water circulating pump having the structure may easily raise a pressure of the cooling water to an appropriate pressure.

Further, the case 3300 may be configured to include a first case 3310 and a second case 3320. The first case 3310 is provided with the cooling water channel 3400, the inlet 3010*a*, and the outlet 3020*a* as well as the heating means 2000. Further, the second case 3320 is coupled with the first case 3310 under the first case 3310 to form a predetermined space inside the case 3300. That is, the second case 3320 is configured so that the motor 3100 and the rotating body 3200 may be embedded in a space between the first case 3310 and the second case 3320 when the second case 3320 is coupled to the first case 3310. It is easy to mount the motor 3100 and the rotating body 3200 in the circulating pump 3000 by the first case 3310 and the second case 3320 having the structure.

The heating means 2000 is provided in the case 3300 and serves to heat the cooling water flowing in the cooling water channel 3400. The heating means 2000 may be formed in various forms, and the forms illustrated in FIGS. 8 and 9 will be described by way of example.

As illustrated in FIGS. 8 and 9, the heating means 2000 may be a PTC element 2000*a* that is plate shape having a predetermined thickness and generates heat when being supplied with power or may be configured to include the PTC element 2000*a*.

The case 3300 is provided with an insertion part 3500 adjacent to the cooling water channel 3400 and inserted with the heating means 2000 such as the PTC element 2000*a*. The insertion part 3500 is a part in which a predetermined area of the case 3300 is hollow so that it is inserted with the plate-like PTC element 2000*a*. For example, an upper portion of the case 3300 is open and the insertion part 3500 may be formed to be adjacent the cooling water channel 3400 and long in the height direction of the case 3300.

Further, a plurality of insertion parts 3500 may be formed in a circumferential direction of the first case 3310 along a circumference of the cooling water channel 3400, and therefore the heating means 2000 may be provided in plural corresponding to the number of insertion parts 3500. In FIG. 9, the insertion part 3500 and the heating means 2000 are each shown in four. However, the number of insertion parts 3500 and heating means 2000 may vary depending on the size and the heat value of the heating means 2000.

Each of the plurality of insertion parts 3500 preferably has the shape in which a side adjacent to the cooling water channel 3400 is planar and the opposite side thereto is arced toward the cooling water channel 3400. The heating means 2000 can be inserted into the planar insertion part 3500 in the form in which the heating surface of the heating means 2000 contacts the insertion part 3500. In this case, since the heating surface of the heating means 2000 is widely provided adjacent to the cooling water channel 3400, the cooling water flowing in the cooling water channel 3400 may be efficiently heated.

Further, in the cooling water circulating pump according to the present invention, the case 3300 may further be provided with a cover 3330 for closing an upper end portion of the case 3300 after the heating means 2000 is inserted into the insertion part 3500.

Figure 10:
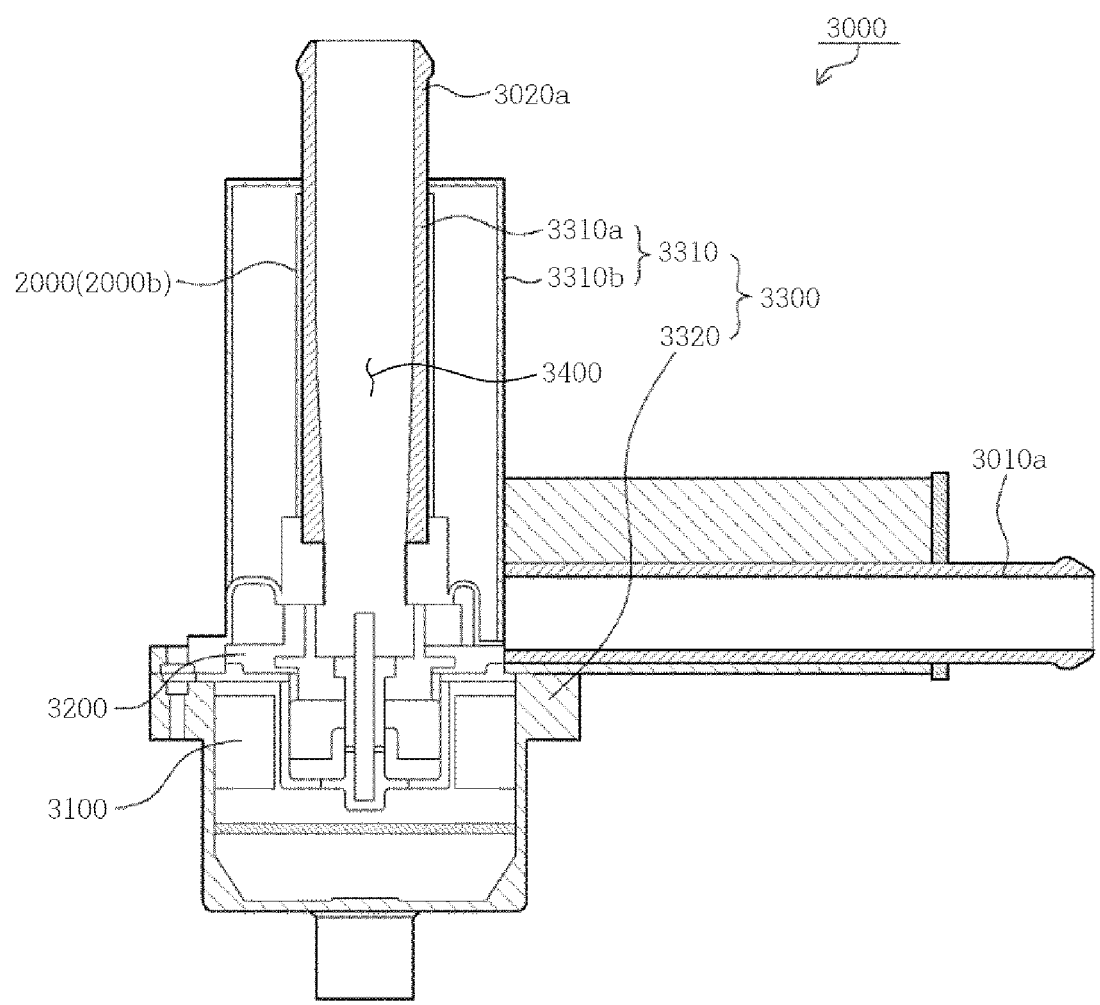
FIG. 10 is another longitudinal cross-sectional view of the cooling water circulating pump according to another exemplary embodiment of the present invention.
Figure 11:
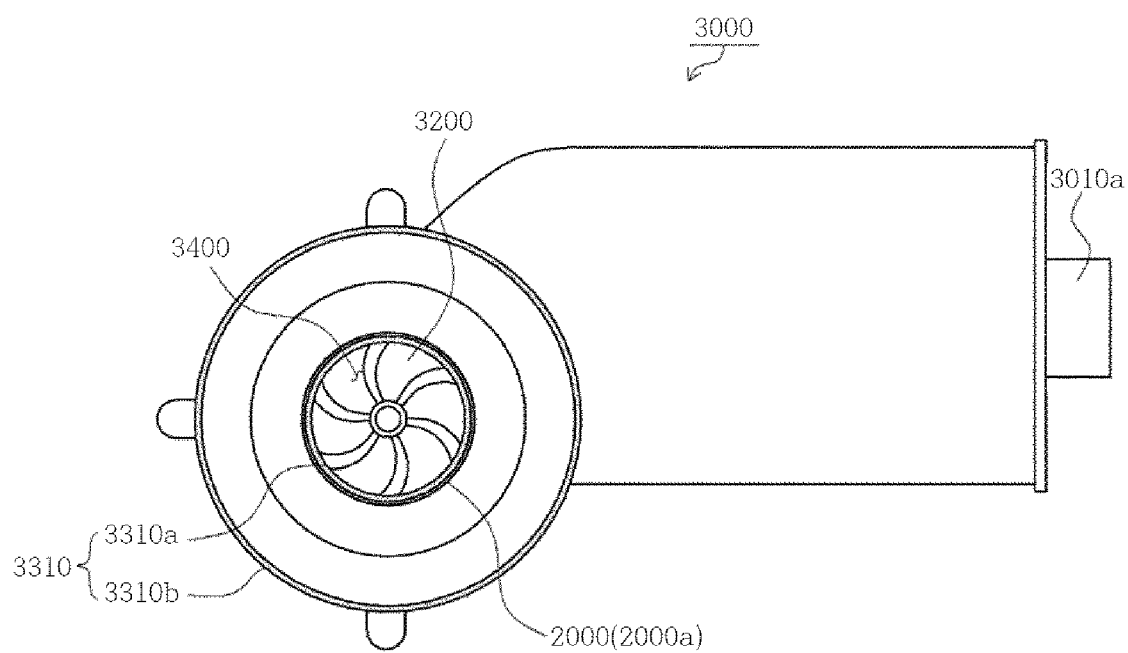
FIG. 11 is another transversal cross-sectional view of the cooling water circulating pump according to another exemplary embodiment of the present invention.

Meanwhile, FIGS. 10 and 11 are views illustrating the cooling water circulating pump in which the case 3300 includes a first tube 3310*a* and a second tube 3310*b*. The first tube 3310*a* has a pipe form for forming the cooling water channel 3400 and the second tube 3310*b* has a pipe form for surrounding the first pipe 3310*a*, and therefore the case 3300 (more specifically, first case 3310) has a double tube shape as a whole.

In this case, the heating means 2000 may be a film heater 2000*b* attached to the outer circumference surface of the first tube 3310*a* in the film form, in which the film heater 2000*b* refers to a hot-wire film, a printed paste, or the like.

As described above, in the vehicular heating devices 100 and 1000 according to the present invention, since the heating means 200 and 2000 are integrally formed in the circulating pumps 300 and 3000 mounted on the second cooling water circulating line L2, the space in which the heating means 200 and 2000 are mounted may be minimized and the discharge air volume of the heater core 110 is not affected, thereby increasing the indoor heating efficiency of the vehicle. In addition, the heat generated by the driving of the motors 310 and 3100 configuring the circulating pumps 300 and 3000 may be additionally used to heat the cooling water, thereby more quickly raising the temperature of the cooling water.

Meanwhile, it is preferable that the heating means 200 and 2000 and the circulating pumps 300 and 3000 according to the present invention are operated under predetermined conditions. That is, the circulating pumps 300 and 3000 may be controlled to be operated only when the rpm of the engine 120 is less than a predetermined rpm, and the heating means 200 and 2000 may be controlled to be operated only when the temperature of the cooling water introduced into the circulating pumps 300 and 3000 is less than a predetermined temperature. The operation control of the circulating pumps 300 and 3000 and the heating means 200 and 2000 may be performed by a control means (for example, microprocessor) including programs for the operation control.

Figure 12:
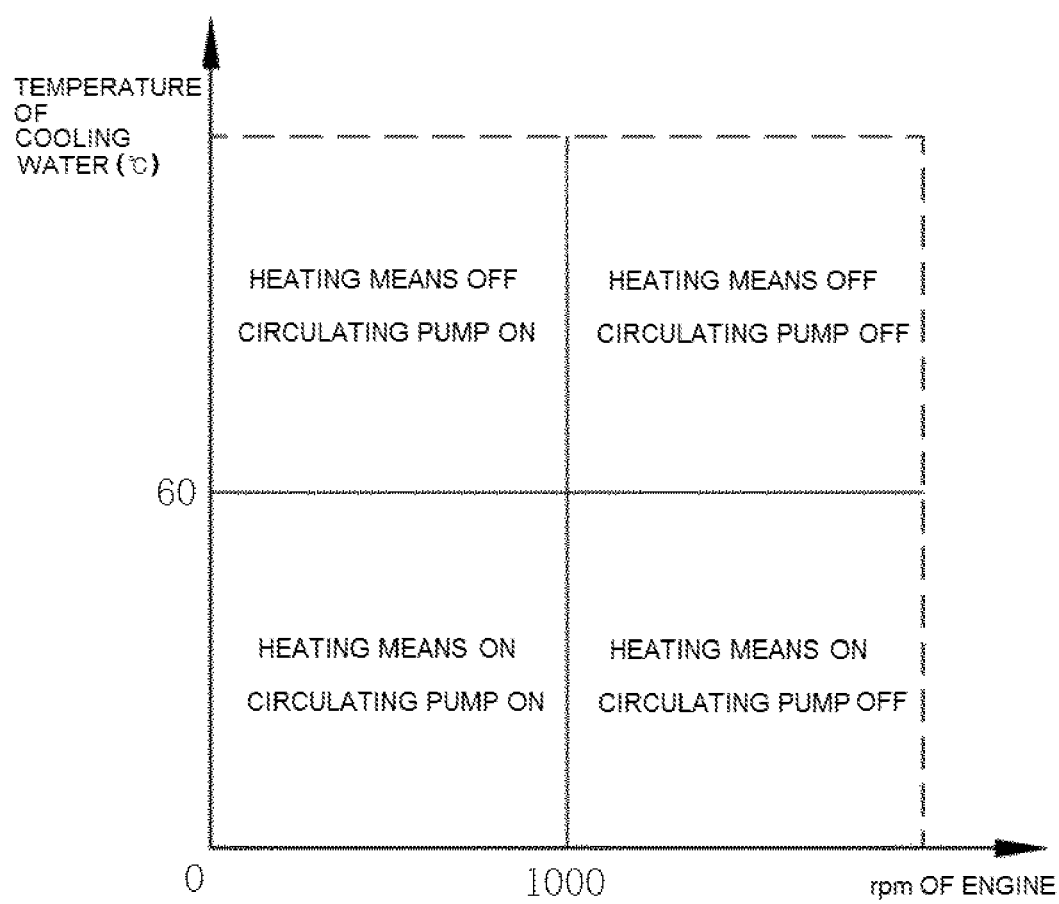
FIG. 12 is a view illustrating operation conditions of a heating means and a circulating pump according to an exemplary embodiment of the present invention.

FIG. 12 illustrates operating conditions of the heating means 200 and 2000 and the circulating pumps 300 and 3000 according to the present invention.

As illustrated in FIG. 12, if the rpm of the engine 120 is less than a predetermined rpm and the temperature (° C.) of the cooling water is less than a predetermined temperature, the heating means 200 and 2000 and the circulating pumps 300 and 3000 are all operated. This corresponds to the cold start that a driver turns on the engine during the winter season. As a result, since the rpm of the engine 120 does not reach a predetermined level, the cooling water is not sufficiently heated and the driver feels cold. Therefore, as the heating means 200 and 2000 are operated, the cooling water is heated and supplied to the heater core 110, and at the same time, the circulating pump 300 and 3000 are also operated to sufficiently supply the cooling water on the second cooling water circulation line L2 passing through the engine 120 to the heater core 110. Therefore, the driver may feel the relatively fast heating feeling when the driver starts the initial start during the winter season.

Further, if the rpm of the engine 120 is equal to or greater than a predetermined rpm but the temperature of the cooling water is still less than the predetermined temperature, the circulating pumps 300 and 3000 are not operated and only the heating means 200 and 2000 may be operated. This is in the state in which the rpm of the engine 120 reaches a predetermined level but the outside air temperature is so low that the cooling water has not yet been sufficiently heated. Therefore, the indoor space of the vehicle is not yet heated comfortably. Therefore, it is preferable that the heating means 200 and 2000 continue to be operated to heat the cooling water supplied to the heater core 110. On the other hand, since the rpm of the engine 120 is equal to or greater than a predetermined rpm, the flow rate of the cooling water supplied to the heater core 110 is sufficient, and therefore there is no need to operate the circulating pumps 300 and 3000.

Further, if the temperature of the cooling water is equal to or higher than a predetermined temperature but the rpm of the engine 120 is less than a predetermined rpm, it is preferable not to operate the heating means 200 and 2000 and to operate only the circulating pumps 300 and 3000. This is the case where a vehicle stops for a while. In this case, since the temperature of the cooling water is equal to or higher than a predetermined temperature, it is not necessary to heat the cooling water, but since the rpm of the engine 120 is less than a predetermined rpm, a sufficient flow rate of cooling water is supplied to the heater core 110 through the circulating pumps 300 and 3000.

Finally, if the temperature of the cooling water is equal to or higher than a predetermined temperature and the rpm of the engine 120 is equal to or greater than a predetermined rpm, it is preferable that the heating means 200 and 2000 and the circulating pumps 300 and 3000 all stop. This is the case where a vehicle is running for a predetermined period of time after turning on the engine. This is because the heat of the engine 120 is recovered so that the temperature of the cooling water is equal to or higher than a predetermined temperature and the flow rate of the cooling water supplied to the heater core 110 is sufficient.

As illustrated, the cooling water temperature for determining whether to operate the heating means 200 and 2000 may be 60° C., and the rpm of the engine 120 for determining whether to operate the circulating pumps 300 and 3000 may be 1000 rpm. However, it is needless to say that the above numerical values may be somewhat changed according to the outside air temperature or the demand of the user.

Meanwhile, the heating means 200 and 2000 and the circulating pumps 300 and 3000 according to the present invention are operated according to the conditions described above if the outside air temperature is lower than a reference temperature and may not be operated if the outside air temperature is equal to or higher than the reference temperature. Since the fuel efficiency is lowered when electricity is used in a vehicle, it is effective to operate the heating means and the circulating pump only when the fast indoor heating is required like the winter season during which the outside air temperature is lower than the reference temperature.

At this time, the reference temperature of the outside air may be 10° C., but the present invention is not limited thereto and therefore the reference temperature may be changed according to other conditions such as the performance of the engine 120.

The heating means and the circulating pump (i.e., cooling water circulating pump) according to the present invention are automatically controlled depending on the predetermined condition as described above and therefore may be efficiently operated only when necessary, thereby minimizing the reduction in the fuel efficiency as well as providing the comfort heating feeling to the driver.

The present invention is not limited to the above-mentioned exemplary embodiments but may be variously applied, and may be variously modified by those skilled in the art to which the present invention pertains without departing from the gist of the present invention claimed in the claims.

DETAILED DESCRIPTION OF MAIN ELEMENTS

L1: First cooling water circulating line
L2: Second cooling water circulating line
C: Vehicular engine cooling unit
H: Vehicular indoor space heating unit
100, 1000: Vehicular heating device
110: Heater core
120: Engine
130: Water pump
150: Thermostat
160: Radiator
200, 2000: Heating means
300, 3000: Circulating pump
301a, 3010a: Inlet
302a, 3020a: Outlet
310, 3100: Motor
320, 3200: Rotating body
330, 3300: Case
340, 3400: Cooling water channel
3500: Insertion part

What is claimed is:

1. A cooling water circulating pump, comprising:
a circulating pump including a motor, a rotating body rotated by a driving force of the motor to move cooling water, wherein the rotating body has an axis of rotation, a case having an empty space formed therein to house the motor, and a cooling water channel formed in the case; and
a heater provided in the case to heat the cooling water flowing in the cooling water channel,
wherein the case has an insertion part formed adjacent to the cooling water channel parallel to the axis or rotation of the case, with an upper portion of the case being open, to allow the heater to be inserted into the insertion part, and
wherein the insertion part has a planar side formed adjacent to the cooling water channel and an arch-like side formed opposite to the planar side to be curved toward the cooling water channel, and the heater is inserted into the insertion part in such a manner that a heating surface of the heater contacts the planar side of the insertion part and is parallel to the axis of rotation,
the case includes a first case portion, a second case portion, and a cover
the insertion part and the cooling water channel are arranged in the first case portion;
the second case portion is coupled to the first case portion under the first case portion, such that the motor and the rotating body are embedded in a space between the first case portion and the second case portion, and
the cover closes an upper end portion of the first case after the heater is inserted into the insertion part.

2. The cooling water circulating pump of claim 1, wherein the case is formed to surround an outer periphery of the motor while being spaced apart from an outside of the motor by a predetermined distance, and
the cooling water channel is formed between the motor and the case.

3. The cooling water circulating pump of claim 1, wherein the circulating pump further includes:
an inlet communicating with the cooling water channel and introduced with the cooling water; and
an outlet communicating with the cooling water channel and discharging the cooling water flowing in the cooling water channel.

4. The cooling water circulating pump of claim 3, wherein the inlet and the outlet are disposed on a straight line.

5. The cooling water circulating pump of claim 3, wherein the circulating pump has a form in which the cooling water channel is formed parallel to the axis of rotation of the rotating body, the inlet is formed long in a length direction of the case to communicate with one end of the cooling water channel, and the outlet communicates with the other end of the cooling water channel at an upper side of the case.

\* \* \* \* \*